United States Patent [19]

Meyer et al.

[11] 4,039,055
[45] Aug. 2, 1977

[54] AUTOMATIC SLACK ADJUSTER FOR DRUM BRAKES

[75] Inventors: Yves Meyer, Taverny; Pierre Courbot, Villiers le Bel, both of France

[73] Assignee: Societe Anonyme D.B.A., Paris, France

[21] Appl. No.: 693,389

[22] Filed: June 7, 1976

[30] Foreign Application Priority Data

June 23, 1975 France .................. 75.19523

[51] Int. Cl.² .......................................... F16D 65/56
[52] U.S. Cl. ................. 188/79.5 GC; 188/196 BA; 192/111 A
[58] Field of Search ....... 188/71.9, 196 BA, 79.5 GC, 188/79.5 GE, 79.5 K, 79.5 P, 79.5 S; 192/111 A

[56] References Cited

U.S. PATENT DOCUMENTS

| | | | |
|---|---|---|---|
| 3,169,608 | 2/1965 | Press et al. ............... | 188/71.9 |
| 3,339,678 | 9/1967 | Burnett .................... | 188/79.5 P |
| 3,526,301 | 9/1970 | Ayers, Jr. ................. | 188/79.5 GC |
| 3,717,227 | 2/1973 | Rath ....................... | 188/79.5 P |
| 3,722,635 | 3/1973 | Torii et al. ............... | 188/196 BA X |

FOREIGN PATENT DOCUMENTS 2,156,899   7/1973   Germany .................. 188/79.5 K

*Primary Examiner* — George E. A. Halvosa
*Attorney, Agent, or Firm* — Ken C. Decker; William N. Antonis; Paul David Schoenle

[57] ABSTRACT

The invention concerns a drum brake of the type comprising brake actuator inserted between two adjacent ends of two brake shoes, the opposite ends thereof co-operating with a fixed anchoring member. An adjusting lever is pivotable relative to one of the shoes upon wear of the linings carried by the shoes, to control relative rotation between two elements of an extensible member. According to the invention, a resilient means normally connect the extensible member to the one shoe and an adjustment limitor are provided to connect the extensible member to the lever when the relative motion between the free end of the lever and the one shoe exceeds a predetermined value.

6 Claims, 14 Drawing Figures

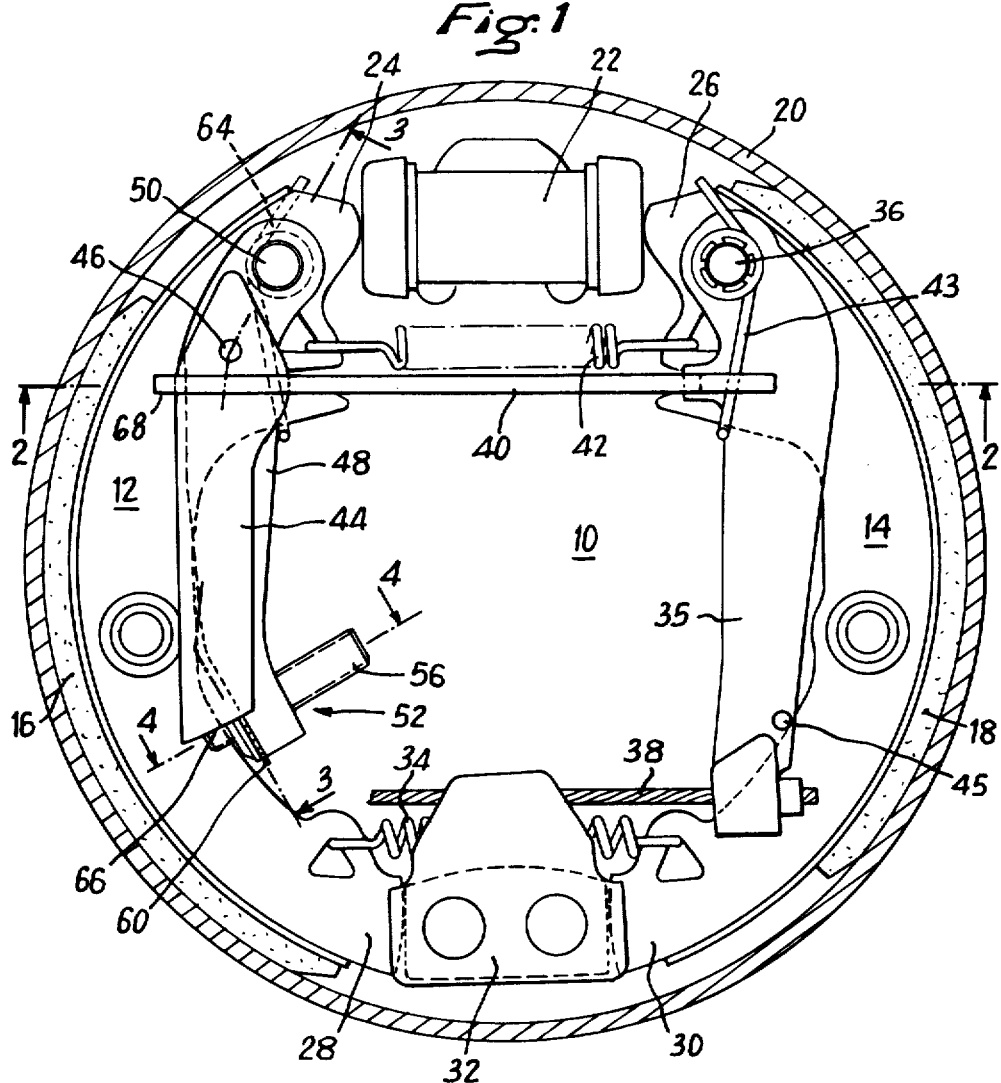
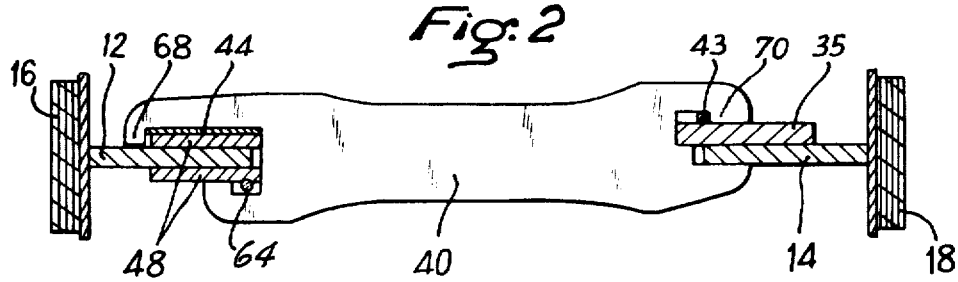

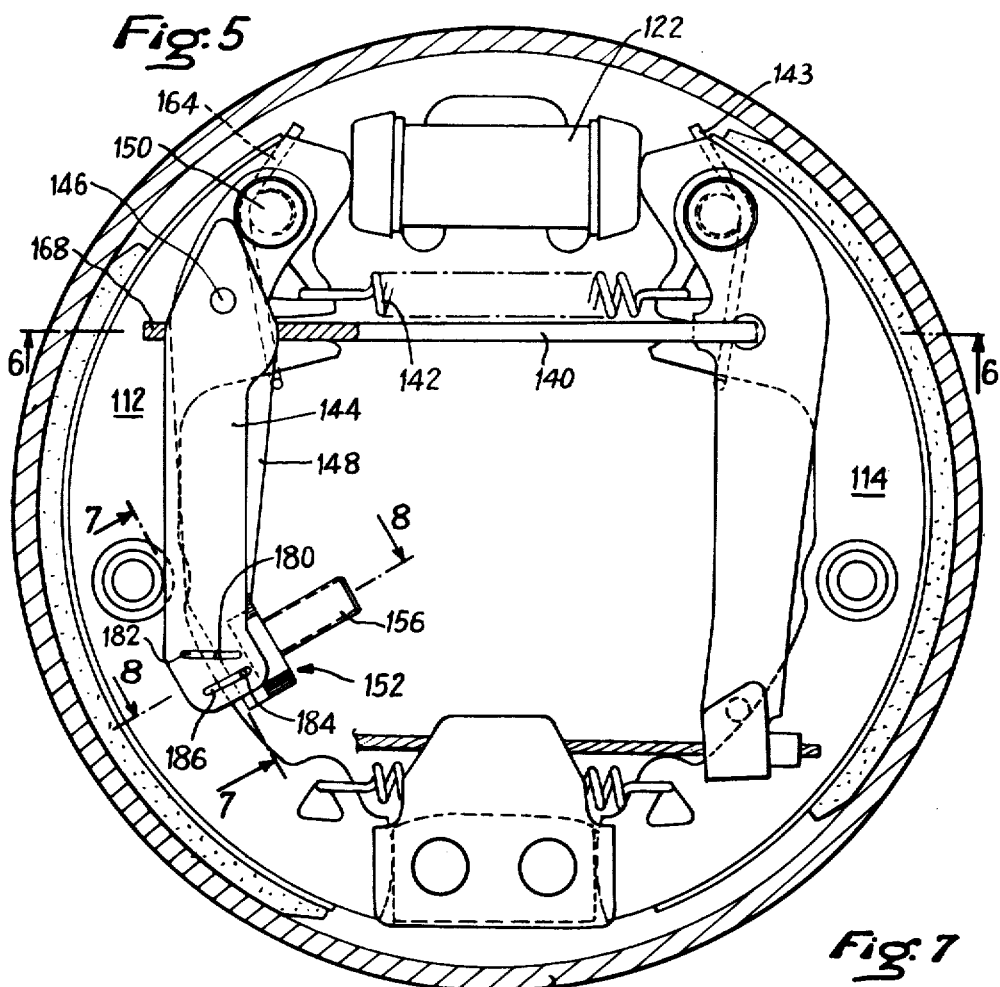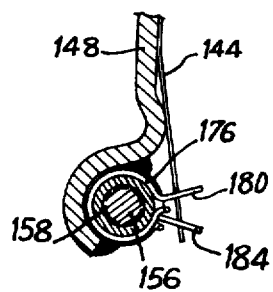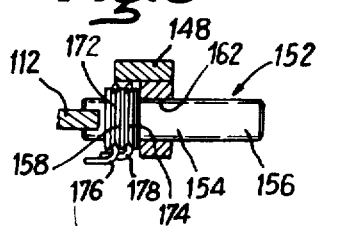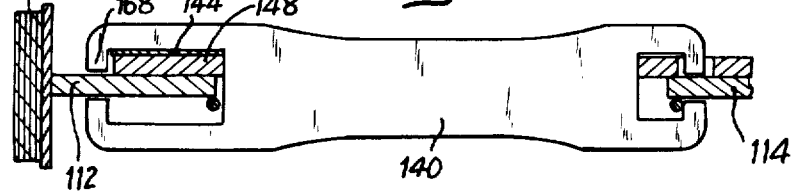

AUTOMATIC SLACK ADJUSTER FOR DRUM BRAKES

The invention relates to a drum brake incorporating an automatic adjuster.

More particularly, the invention concerns a drum brake comprising two brake shoes, brake applying means inserted between two adjacent ends of the shoes, the opposite ends thereof cooperating with an anchoring member mounted on a fixed support, and adjusting pivotable relative to a first of said shoes, pivoting of said lever being controlled by an adjusting member connected to the second shoe or to the fixed support, and adjusting means comprising an extensible member formed of two elements, relative rotation of which changes the length of said member, one of said elements being non-rotatably connected to the first shoe, rotation of the other element being controlled by a displacement of the free end of said adjusting lever with respect to the first shoe.

In known drum brakes of this type the wear on the linings of the shoes is taken up due to the cooperation of a toothed sector on the end of the adjusting lever with a pawl pivoted on the shoe bearing the adjusting lever, the pawl being spring-biased into engagement with the toothed sector. The relative arrangement of these components is such that, when the travel required to operate the brake exceeds a given value, the lever pivots far enough to enable the pawl to skip a tooth on the toothed sector on the end of the lever, so changing the relative idle positions of the shoes. Such a device has many advantages, in particular great simplicity. However, repeated sharp application of the brake leads to heating and expansion of the drum and may cause over-adjustment and consequent excessive wear on the linings of the shoes.

To overcome this drawback, the invention proposes a brake of the above type, characterized in that resilient means normally connect the extensible member to the first shoe, adjustment limiting means being provided to connect the extensible member to the adjusting lever against said resilient means when the motion of the free end of the adjusting lever with respect to the first shoe exceeds a predetermined value.

In a particular embodiment of the invention, the adjustment limiting means comprises an intermediate lever pivoted on the first shoe and bearing the extensible member at its free end, said adjusting member cooperating with the intermediate lever by way of a connection with play defining the predetermined value.

In another embodiment of the invention, the adjustment limiting means comprise a connection with play capable of associating the extensible member to the free end of the adjusting lever when the motion of the said end relative to the first shoe exceeds the predetermined value.

Various embodiments of the invention will be now be described by way of example with reference to the accompanying drawings, in which:

FIG. 1 is a general view of a brake embodying the principles of the invention;

FIG. 2 represents a section through the brake along a line 2—2 in FIG. 1;

FIG. 5 is a general view of another brake embodying the principles of the invention;

FIG. 6 represents a section through the brake along a line 6—6 in FIG. 5;

FIG. 7 shows a section on a line 7—7 in FIG. 5;

FIG. 8 shows a section on a line 8—8 in FIG. 5;

Figure 3:
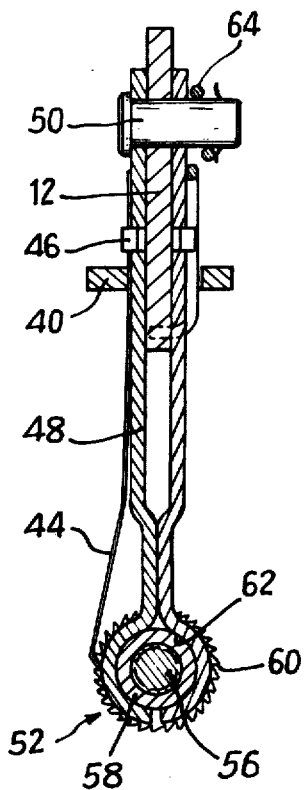
FIG. 3 is a sectin along a line 3—3 in FIG. 1.
Figure 4:
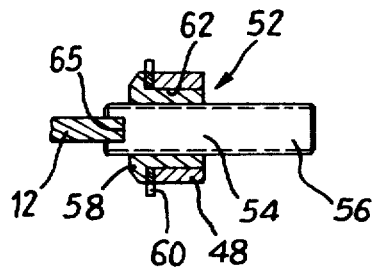
FIG. 4 is a section along a line 4—4 in FIG. 1.
Figure 9:
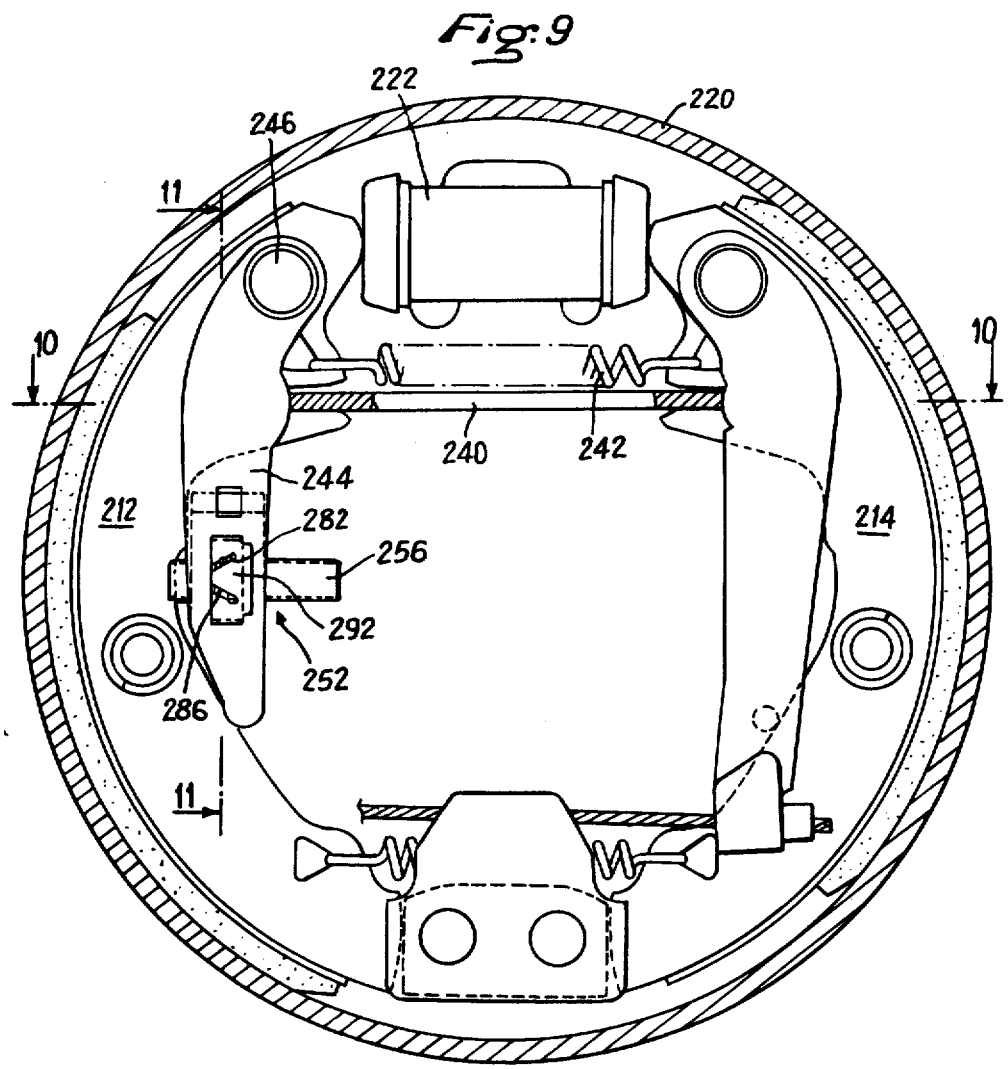
FIG. 9 is a general view of still another brake embodying the principles of the invention.
Figure 10:
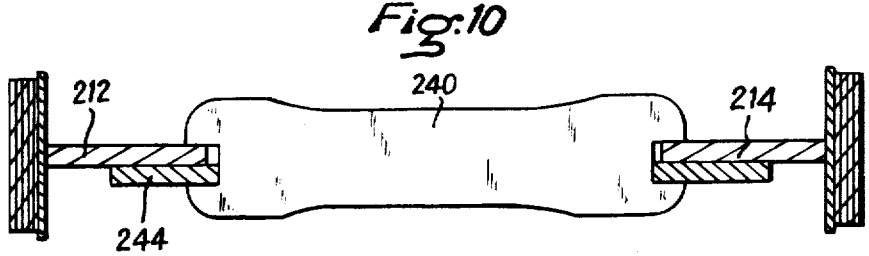
FIG. 10 is a section along a line 10—10 in FIG. 9.
Figure 11:
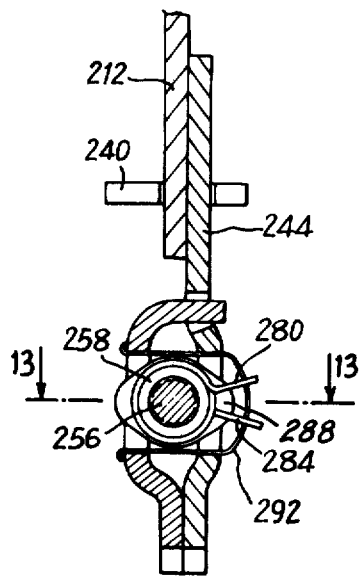
FIG. 11 is a section on a line 11—11 in FIG. 9.
Figure 12:
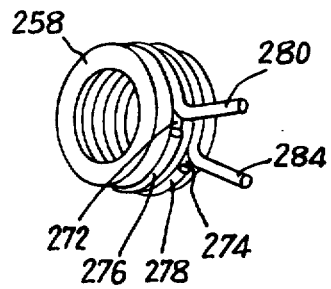
FIG. 12 is a perspective view of part of the wear take-up device used in the brake shown in FIGS. 5 and 9.

The drum brake shown in FIGS. 1 to 4, has a brake plate 10 designed to be mounted on a fixed element of the vehicle, for example an axle flange. Two brake shoes 12, 14 are slidable on the plate 10. The shoes 12, 14 bear respective linings 16, 18 designed to cooperate with a drum 20. In the embodiment illustrated, the brake applying means are a hydraulically operated wheel cylinder 22 situated between two adjacent ends 24, 26 of the shoes 12, 14 respectively. The other two ends 28, 30 of the shoes 12, 14 are urged into floating contact with a fulcrum block by a spring 34.

In the embodiment illustrated, a handbrake lever 35 is pivoted on a pin 36 near the end 26 of the shoe 14. The lever 35 on whose free end a hand brake cable 38 is mounted, is connected to the shoe 12 by a spacer 40 near the wheel cylinder 22. A spring 42 biases the shoes 12, 14 into their idle positions, in which they rest on the spacer 40. A hairpin spring 43 surrounding the pin 36 and resting on both the shoe 14 and the lever 35 urges the lever 35 on to the web of the shoe 14 by way of a stud 45 on the free end of the lever. Also, as FIG. 2 shows, the spring 43 bears on a lug 70 on the spacer 40 to keep the latter abutting on the handbrake lever 35 during operation of the wheel cylinder 22.

An intermediate lever 48 is pivoted on a pin 50 near the end 24 of the shoe 12. A sheet-metal adjusting lever 44 is pivoted on the intermediate lever 48 in turn by way of a pin 46 close to the pin 50.

The free end of the intermediate lever 48 bears adjusting means generally designated 52. The adjusting means comprises an extensible member 54 consisting of a screw forming element 56 and a nut forming element 58. The nut forming element 58 has a portion of smaller diameter on to which a serrated ring 60 is force-fitted to form a ratchet wheel. As FIG. 3 shows, the free end of the intermediate lever 48 comrprises a substantially cylindrical eye 62 which freely receives the smaller-diameter portion of the nut forming element 58 so that the extensible member 54 is urged on to the web of the shoe 12 by a hair pin spring 64 surrounding the pin 50 and supported on both the shoe 12 and the intermediate lever 48. That end of the screw forming element 56 cooperating with the web of the shoe 12 contains a recess 65 to receive the web of the shoe and to prevent rotation of the screw forming element 56. As FIGS. 1 and 3 show, the end of the adjusting lever 44 is bent to engage the teeth of the ratchet wheel 60, with which it cooperates by means of a cam surface 66 which, in this embodiment, forms an arc of a circle of which the centre is offset relative to the pivoting axis 46 of the adjusting lever 44.

As FIG. 2 illustrates, the spacer 40 in fact rests not on the web of the shoe 12 but on the intermediate lever 48 and adjusting lever 44. A lug 68 on the spacer 40 enables it to pivot the adjusting lever 44 when the shoes 12, 14 are urged apart by the wheel cylinder 22. When the wheel cylinder 22 operates, the lug 68 can also pivot the lever 48 if the motion of the spacer 40 relative to the shoe 12 exceeds a predetermined value. As will be clear below, this connection with play between the intermediate lever 48 and spacer 40 constitutes adjustment limiting means which prevent operation of the adjusting means 52 beyond this predetermined value for the relative motion of the spacer 40 and shoe 12.

The drum brake just described with reference to FIGS. 1 to 4 operates as follows:

When the brake is idle, its various components occupy the positions shown in the Figures. When the wheel cylinder 22 operates, the brake shoes 12, 14 move apart until their linings 16, 18 make contact with the drum 20. When the shoe 12 approaches the drum, it carries with it the intermediate lever 48 and the adjustment means 52 owing to the action of the spring 64, given the connection with play between the spacer 40 and lever 48. The spacer 40, however, follows the shoe 14 under the influence of the hairpin spring 43, so that its lug 68 causes the adjusting lever 44 to pivot counterclockwise viewing FIG. 1 on its pin 46 while the intermediate lever 48 remains with the shoe 12. Due to the cooperation between the cam surface 66 and the ratchet wheel 60, the pivoting of the adjusting lever 44 causes the nut forming element 58 to turn counterclockwise viewing FIG. 3 round the screw forming element 56. This rotation of the nut forming element 58 on the screw forming element 56 leads to lengthening of the extensible member 54, that is, to an increase in the distance separating the nut forming element 58 from that end of the screw forming element 56 cooperating with the shoe 12.

If, during operation of the wheel cylinder 22, the relative motion of the shoe 12 and spacer 40 does not exceed the value defined by the play between the lug 68 and the lever 48, the latter behaves as if attached to the shoe 12 except that its free end has moved away from the shoe to an extent determined by the rotation of the nut forming element 58 on the screw forming element 56. If, however, operation of the wheel cylinder 22 causes sufficient relative motion of the spacer 40 and shoe 12 to bring the lug 68 into contact with the intermediate lever 48, in spite of the latter's motion resulting from operation of the adjusting means 52, the spacer 40 causes the intermediate lever 48 to pivot anticlockwise on its pin 50, counteracting the hairpin spring 64, so that there is no longer relative motion between the cam surface 66 on the adjusting lever 44 and the ratchet whel 60 of the adjusting means 52, and so that overadjustment of the brake is avoided.

On relief of the braking pressure in the wheel cylinder 22, if the adjustment limiting means have operated (that is, if the extensible member 54 has been urged away from the shoe 12 due to pivoting of the intermediate lever 48 on its pin 50), a first phase sees the extensible member 54 resume its position abutting on the web of the shoe 12 under the influence of the hair pin spring 64. During a second phase, the intermediate lever 48 and adjusting means 52 move with the shoe 12, whereas the adjusting lever 44 pivots clockwise on its pin 46 under the influence of the spring 42 and spacer 40 until the spacer again abuts on the intermediate lever 48, whose new position, resulting from lengthening of the adjusting member 54, defining the new idle spacing of the ends 24, 26 of the shoes 12 and 14. During this return movement, the cam-shaped end 66 of the adjusting lever 44 also rotates clockwise and skips a tooth in the ratchet wheel 60 as the radius from pin 46 to the cam shaped end 66 engaging the ratchet wheel 60 decreases with clockwise rotation relative to the intermediate lever 48. However, if the adjustment limiting means have not operated during the operation of the wheel cylinder 22, the return of the brake to its idle position occurs as described in the second phase. In some cases, if the spacing required in order to apply the linings 16, 18 to the drum 20 is very slight, it may happen that the cam surface 66 does not skip a tooth in the ratchet wheel 60 of the adjusting means 52.

When the brake is operated manually by means of the handbrake cable 38, the handbrake lever 35 pivots clockwise on its pin 36 to urge the shoes on to the drum 20 (the shoe 14 directly and the shoe 12 by way of the spacer 40). This manual application of the brake does not bring the wear take-up device of the shoe 12 into operation.

In the drum brake illustrated in FIGS. 5 to 8, elements corresponding to those in the first embodiment bear the same reference numerals plus 100.

The brake shown in FIG. 5 is of the same type as that shown in FIG. 1. It differs only in the adjusting means 152 and in the cooperation of the adjusting lever 144 with these adjusting means. As best shown in FIGS. 7 and 8, the adjusting means 152 comprise, as in the previous embodiment, an extensible member 154 consisting of a screw forming element 156 and a nut forming element 158. The intermediate lever 148 contains an aperture 162 receiving the screw forming element 156. Under the influence of the haripin spring 164, the intermediate lever 148 urges the extensible member 154 towards the web of the shoe 112 by bearing on the nut forming element 158. This element 158 contains two annular grooves 172, 174 for friction springs 176, 178 respectively. In this embodiment each spring 176, 178 comprises a single turn. One end 180 of the spring 176 is bent radially and enters a slot 182 in the adjusting lever 144. Similarly, one end 184 of the spring 178 is bent radially and enters another slot 186 in the adjusting lever 144. The slots 182 and 186 together form an acute angle, and in this embodiment the slot 186 is substantially parallel to the axis of the adjusting means 152, whereas the slot 182 forms an arc of a circle centred near the pin 146. Also, the internal diameters of the springs 176, 178 when idle are identical and substantially less than the external diameter of the grooves 172, 174 so that a frictional force is created between each spring and the nut forming element 158. These frictional forces are substantially equal when the wheel cylinder 122 in not operating.

The drum brake just described with reference to FIGS. 5 to 8 operates as follows.

As in the first embodiment, the various components of the brake are shown in their idle positions in the FIGS. When the wheel cylinder 122 operates, the shoes 112, 114 are urged on to the drum 120, the shoe 114 carrying the spacer 140 with it under the influence of the hairpin spring 143. When the spacer 140 and shoe 12 move relative to one another, the lug 168 rotates the adjusting lever 144 counterclockwise on its pin 146. The intermediate lever 148 and adjusting means 152, however, are still associaed with the shoe 112 as long as the lug 168 does not engage the intermediate lever 148. Consequently that end of the adjusting lever 144 containing the slots 182, 186 moves relative to the extensible member 154 and therefore relative to the ends 180, 184 of the springs 176, 178. The slots 182, 186 define an acute angle between them, and the ends 180 184 of the springs are urged apart so that the frictional force between the springs 176 and groove 172 tends to fall below the frictional force, between the spring 178 and groove 174. The nut forming element 158 therefore moves with the spring 178, whose movement is determined by the shape of the slot 186. In this embodiment the slot 186 forms an arc of a circle of which the centre is offset relative to the pivoting axis 146 of the adjusting lever 144, so that the nut forming element 158 turns clockwise viewing FIG. 5. The spring 176, however, remains substantially stationary since the slot 182 is centred on the pin 146. In this embodiment, therefore, counterclockwise pivoting of the adjusting lever 14 causes the nut forming element 158 to turn on the screw forming element 156 in the direction corresponding to lengthening of the extensible member 154, while the spring 176 remains substantially stationary relative to the screw forming element 156. As in the previous embodiment, if operation of the wheel cylinder 122 causes sufficient relative motion of the spacer 140 and shoe 112 for the lug 168 to engage the intermediate lever 148, the latter is rotated counterclockwise on its pin 150, counteracting the spring 164, so that the levers 144, 148 then pivot together on the pin 150.

When the braking pressure in the wheel cylinder 122 is relieved, the shoe return spring 142 urges the shoes off the drum 120 and therefore urges the shoe 112 towards the spacer 140. If the applicaton of the brake as required the adjustable limiting means to function, a first phase sees the assembly comprising the levers 144, 148 and adjusting means 152 pivot clockwise on the pin 150 under the influence of the spring 164. In a second phase, when the extensible member 154 abuts on the web of the shoe 112 again, the adjusting lever 144 pivots clockwise on its pin 146. The configuration of the slots 182, 186 is such that when the lever 144 pivots in this direction the ends 180, 184 of the springs 176, 178 are urged towards one another. As a result, the frictional force between the spring 176 and the nut forming element 158 exceeds the frictional force between the spring 178 and this element 158. The element 158 therefore remains stationary relative to the screw forming element 156, due to the action of the spring 176, whereas the spring 178 slides in its groove 174. (The slot 182 which determines the motion of the spring 176 is centred on the pivot 146 of the lever 144, so that the spring 176 assoicated with the nut forming element 158 remains stationary relative to the screw forming element 156). At the end of this movement, the springs 176, 178 and leaves 148, 144 are again in the positions shown in FIGS. 5 and 7. As in the previous embodiment, if the adjustment limiting means have not been used during operation of the wheel cylinder 122, the return of the device to its idle position takes place in the same manner as in the second phase.

Like the first embodiment, the device described with reference to FIGS. 5 to 8 provides lining wear take-up limited to a predetermined value defined by the play between the lug 168 on the spacer 140 and the intermediate lever 148.

A third embodiment of the invention will now be described with reference to FIGS. 9 to 14, in which elements like those in the first embodiment bear the same reference numerals plus 200.

Figure 13:
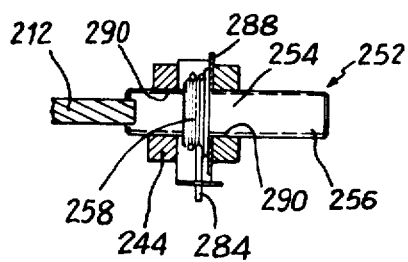
FIG. 13 represents a section along a line 13—13 in FIG. 11.

In the embodiment shown in FIGS. 9 to 14, the adustment means 252 are very similar to the adjustments means described with reference to FIGS. 5 to 8, and the brake differs chiefly in the adjustment limiting means. The adjusting lever 244 is pivoted directly on the shoe 212 on a pin 246. As in the other embodiments, the adjusting means 252 comprise an extensible member 254 consisting of a screw forming element 256 and a nut forming element 258. However, the adjusting means 252 are mounted on the adjusting lever 244 directly, near the free ends, by way of a connection with play and a resilient washer 288 constituting the adjustment limiting means. The end of the lever 244 is a fork of which the arms contain two axially aligned apertures 290 to receive the screw forming element 256. The nut forming element 258 and resilient washer 288 are arranged with predetermined play between the arms of the lever 244. Under the influence of the shoe return spring 242 and spacer 240, the adjusting lever 244 is normally urged clockwise to compress the resilient washer 288 and to urge the screw forming element 256 on to the web of the shoe 212 by way of the nut forming 258, as shown in FIG. 13. As in the second embodiment, two grooves 272, 274 on the outside surface of the nut forming element 258 receive respective springs 276, 278 each having a single turn and one end 280, 284 respectively which is bent radially outwards. The springs 276, 278 are installed like the springs 176, 178 in the previous embodiment, and their ends 280, 284 traverse slots 282, 286 respectively in a plate 292 attached to the adjusting lever 244. In this embodiment the slots 282, 286 are both inclinded in opposite directions relative to the axis of the extensible member 254.

The drum brake just described with reference to FIGS. 9 to 14 operates as follows.

Figure 14:
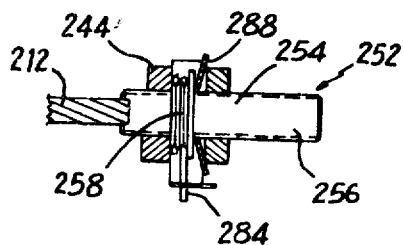
FIG. 14 is a view similar to FIG. 13, but showing the various components in the positions occupied on operation of the brake.

When the wheel cylinder 222 operates, the shoes 212, 214 are urged apart and on to the drum 220 as in the previous embodiments. During this movement, the resilient washer 288 illustrated in the rest position in FIG. 14 between the nut forming element 258 and adjusting lever 244 urges the extensible member 254 into engagement with the shoe 212 and the lever 244 into engagment with the spacer 240. The adjusting lever 244 is therefore rotated counterclockwise on its pin 246, while the extensible member 254 follows the movement of the shoe 212. This relative motion of the lever 244 and extensible member 254 causes the ends 280, 284 of the springs 276, 278 to move along the slots 282, 286. The arrangment of these slots is such that the ends 280, 284 are urged towards one another (as shown best in FIG. 12), so that the frictional force between the spring 276 and the nut forming element 258 becomes greater than that between the spring 276 and the element 258. The element 258 therefore follows the movement imposed by the spring 276, that is, the movement defined by the slot 282. As the slot 282 is inclined relative to the axis of the extensible member 254, the nut forming element 258 turns clockwise viewing FIG. 11 on the screw forming element 256. Simultaneously, the spring 278 turns counterclockwise on the nut forming element 258 due to cooperation between its end 284 and the slot 286. If the application of the brake demands a sufficient distance between the shoes 212, 214 to bring the nut forming element 258 to abut on that arm of the adjusting lever 244 which does not support the washer 288, as shown in FIG. 14, the force stored in the resilient washer 288 no longer urges the extensible member 254 towards the web of the shoe 212, and there is therefore no longer rotative motion of the lever 244 and extensible member, and cosequently no longer any take-up of wear.

When the braking pressure in the wheel cylinder 222 is relieved, the shoes 212, 214 are urged towards one another by the spring 242. If the application of the brake has brought the adjustment limiting means into operation, the lever 244 and extensible member 254 continue to be associated until the effect of the resilient washer 288 begins to urge the extensible member 254 back on to the web of the shoe 212. From this moment the device behaves exactly as if the adjustment limiting means has not been used, and under the influence of the return spring 242 the resilient washer 288 is compressed by way of the lever 244 and spacer 240 until it resumes the position shown in FIG. 13. During this movement the lever 244 pivots clockwise on its pin 246, while the extensible member 254 remains in contact with the shoe 212, so that the ends 280, 284 of the springs 276, 278 again move along the slots 282, 286. When the lever 244 turns in this direction, the relative positions of the slots 282, 286 are such that the ends 280, 284 are urged apart, and such that the friction between the spring 278 and the nut forming element 258 exceeds the friction between the spring 276 and this element. This element 258 therefore follows the movement imposed by the slot 286. As a result of this movement, the nut forming element 258 turns clockwise viewing FIG. 11 on the screw forming element 256.

The angle through which the nut forming element 258 will finally have turned on the screw forming element 256 in the direction corresponding to lengthening of the extensible member 254 is equal, therefore, to the sum of the angles defined by the inclination of the slots 282, 86 to the axis of the extensible member 254, the wear take-up during operation of the brake being defined by the slot 282 whereas the wear take-up during the release of the brake is defined by the slot 286. Such an arrangement enables the wear take-up to be distributed between the application and the release of the brake as required, the total wear take-up being defined in any case by the angle between each of the two slots.

Like the other embodiments, the embodiment described with reference to FIGS. 9 to 14 enables over-adjustment of the brake to be avoided by associating the adjusting lever and adjusting means when their relative motion exceeds a predetermined value.

In another embodiment, not shown, the springs 143 and 164 in the embodiment described with reference to FIGS. 5 to 8 are replaced with a resilient portion of an adjusting lever of the same type as the lever 144, capable of bearing on the inner edge of an intermediate lever of the same type as the lever 148. This resilient portion urges the intermediate lever on to a shoe of the same type as shoe 112 by way of the adjusting means, and it urges a spacer on to the other shoe by way of the adjusting lever.

In the embodiment just described a handbrake lever is associated with the acutating means. It will be appreciated, however, that the manual control is not essential to the invention. Similarly, the actuating means are not restricted to a wheel cylinder and may instead, for example, be a wedge — or cam — type control without exceeding the scope of the invention. Also, a spacer may be inserted between the shoes 12, 1222 or 212 and a fixed component of the brake as a substitute for spacers 40, 140 and 240. In the latter case the wear take-up device will respond not to relative motion of the two shoes, but to the motion of the shoe on which it is mounted relative to the fixed component of the brake.

What is claimed is:

1. A drum brake comprising two brake shoes, a brake applying means disposed between said two brake shoes, an intermediate lever pivotally mounted on one of the brake shoes, an adjusting lever pivotally mounted on said intermediate lever, a spacer engaging the other of the brake shoes and said adjusting lever, an extensible member carried by said intermediate lever and including two elements, one of which non-rotatably engages the one brake shoe and the other element engages the adjusting lever, said spacer being movable upon a brake application to pivot said adjusting lever relative to said intermediate lever and to rotate the other element via the engagement with the adjustment lever and a resilient means normally biasing the extensible member into engagement with the one brake shoe and said spacer also being engageable with said intermediate lever to limit relative rotation between said adjusting lever and said intermediate lever when the rotation therebetween exceeds a predetermined value to limit the extension of said extensible member.

2. The drum brake of claim 1 in which said spacer cooperates with said intermediate lever with play and cooperates with said adjusting lever without play.

3. The drum brake of claim 1 in which said resilient means comprises a hairpin spring associated with the pivotal mounting of said intermediate lever and said hairpin spring rests on the one shoe and said intermediate lever.

4. The drum brake of claim 1 in which said intermediate lever forms a connection with play with said spacer and said intermediate lever carries said extensible member such that adjusting lever engages said extensible member.

5. The drum brake of claim 1 in which said adjusting lever includes a cam surface and said extensible member includes a ratchet wheel, said cam surface operatively engaging said ratchet wheel to impart rotation to said ratchet wheel upon pivoting of the adjusting lever relative to said intermediate lever by said spacer.

6. The drum brake of claim 5 in which the cam surface forms substantially an arc of a circle of which the center is offset from the pivoting axis of the adjusting lever.

* * * * *